United States Patent
Salandre et al.

(10) Patent No.: US 10,795,519 B2
(45) Date of Patent: Oct. 6, 2020

(54) VEHICLE INTERIOR PANEL WITH SHAPE-CHANGING SURFACE

(71) Applicant: Faurecia Interior Systems, Inc., Auburn Hills, MI (US)

(72) Inventors: Maxime Salandre, Rochester, MI (US); Eloise Mariotte, Portland, OR (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 16/263,381

(22) Filed: Jan. 31, 2019

(65) Prior Publication Data
US 2020/0249779 A1    Aug. 6, 2020

(51) Int. Cl.
G06F 3/044        (2006.01)
G06F 3/041        (2006.01)
G06F 3/0488       (2013.01)
B60K 35/00        (2006.01)

(52) U.S. Cl.
CPC ............ G06F 3/044 (2013.01); G06F 3/0416 (2013.01); G06F 3/0488 (2013.01); B60K 35/00 (2013.01)

(58) Field of Classification Search
CPC ...... G06F 3/044; G06F 3/0416; G06F 3/0488; B60K 35/00
See application file for complete search history.

(56) References Cited

U.S. PATENT DOCUMENTS

| | | | |
|---|---|---|---|
| 5,559,665 A | 9/1996 | Taranowski et al. | |
| 8,547,339 B2* | 10/2013 | Ciesla | G06F 3/0202 345/156 |
| 8,858,003 B2 | 10/2014 | Porter et al. | |
| 9,417,697 B2 | 8/2016 | Lee et al. | |
| 9,543,948 B2 | 1/2017 | Curtis et al. | |
| 9,553,254 B2 | 1/2017 | Egron et al. | |
| 10,126,928 B2* | 11/2018 | Gibson | G06F 3/04847 |
| 10,485,094 B1* | 11/2019 | Isohatala | G01R 27/2605 |
| 2009/0002328 A1* | 1/2009 | Ullrich | G06F 3/016 345/173 |
| 2010/0329964 A1 | 12/2010 | Roos | |
| 2011/0304550 A1* | 12/2011 | Romera Jolliff | G06F 3/016 345/168 |
| 2012/0105333 A1* | 5/2012 | Maschmeyer | G06F 3/016 345/173 |

(Continued)

FOREIGN PATENT DOCUMENTS

EP    3028993 A1    6/2016

OTHER PUBLICATIONS

European Search Report corresponding to European Application No. EP 20 15 4840, dated May 28, 2020, 10 pages.

*Primary Examiner* — Afroza Chowdhury
(74) *Attorney, Agent, or Firm* — Reising Ethington P.C.

(57) ABSTRACT

A vehicle interior panel includes a capacitive touch panel with a control surface that can assume different contours. The capacitive touch panel includes a conductive layer beneath the control surface that is sufficiently flexible to maintain electrical continuity when the touch panel changes shape. The conductive layer can be formed from carbon nanobuds or other fullerenes to enable such flexibility, while also providing optical transparency. Pushers situated behind the touch panel extend and retract to stretch the touch panel and allow it to morph from one shape to another.

17 Claims, 2 Drawing Sheets

(56) References Cited

U.S. PATENT DOCUMENTS

| | | | |
|---|---|---|---|
| 2012/0200529 A1* | 8/2012 | Ciesla | G06F 3/0202 |
| | | | 345/174 |
| 2012/0235935 A1 | 9/2012 | Ciesla et al. | |
| 2012/0306787 A1* | 12/2012 | Ciesla | G06F 3/0202 |
| | | | 345/173 |
| 2015/0077398 A1* | 3/2015 | Yairi | G06F 3/0414 |
| | | | 345/175 |
| 2015/0205416 A1 | 7/2015 | Yairi et al. | |
| 2015/0261297 A1 | 9/2015 | Quek | |
| 2015/0277735 A1* | 10/2015 | Gibson | G06F 3/04847 |
| | | | 715/716 |
| 2017/0075443 A1 | 3/2017 | Gattis et al. | |
| 2017/0076885 A1 | 3/2017 | Stryker | |

* cited by examiner

VEHICLE INTERIOR PANEL WITH SHAPE-CHANGING SURFACE

TECHNICAL FIELD

The present disclosure is related generally to vehicle interior panels and, more particularly, to such panels having a shape-changing surface.

BACKGROUND

Vehicle interior panels sometimes employ touch-sensitive controls, as opposed to mechanical switches or dials, that allow vehicle occupants to interface with various vehicle systems, such as sound systems, HVAC systems, navigation systems, etc. Touch-sensitive controls may include resistive touchscreens or capacitive touchscreens. Manual pressure applied to a resistive touchscreen completes an electrical connection with an underlying layer, and a control system relies on directional resistance to identify the location of the touch. Human or other conductive contact with a capacitive touchscreen changes capacitance or otherwise disrupts an electrical field along the screen, and a control system relies on directional electrical measurements to identify the location of the touch. While touchscreens have become ubiquitous in portable electronic devices, they have not been as successfully implemented in vehicle interiors. One notable difference between a portable electronic device and a vehicle interior control panel is that, in a vehicle, the user often has their vision focused on other matters such as driving and therefore cannot see which part of the panel they are touching.

U.S. patent application Pub. No. 2015/0261297 presents one solution, which is an add-on device which users can removably attach over a capacitive touchscreen. The add-on device has compressible buttons extending away from the underlying touchscreen with conductive pads on the underside of each compressible button. When the user presses a button while the device is attached over the touchscreen, the conductive pad contacts the touchscreen as a substitute for the user's finger. This provides interface locations which the user can feel, but defeats one of the purposes of a capacitive touch screen, which is to provide a visual indicator of the function being selected. The user would have to know which app icon is hidden under each button, which typically varies from device to device.

SUMMARY

An illustrative vehicle interior panel includes a substrate, a capacitive touch panel supported over the substrate, and a pusher extending between the substrate and the touch panel. The capacitive touch panel includes an outer control surface facing away from the substrate and an electrically conductive layer between the outer control surface and the substrate. The pusher is changeable between a retracted condition and an extended condition. The capacitive touch panel is sufficiently flexible to elastically change between a first shape, in which the outer control surface has a first contour, and a second shape, in which the outer control surface has a second contour different from the first contour. The touch panel is configured to assume the first shape when the pusher is in the retracted condition and to assume the second shape when the pusher is in the extended condition, and the conductive layer maintains electrical continuity when the touch panel changes between first and second shapes.

In some embodiments, the conductive layer comprises carbon nanobuds.

In some embodiments, the vehicle interior panel includes a light source between the substrate and the touch panel. At least a portion of the touch panel is at least partly transparent and permits light from the light source to be emitted from the interior panel through the touch panel.

In some embodiments, the light source illuminates a symbol along the outer control surface.

In some embodiments, the illuminated symbol is located over the pusher.

In some embodiments, a symbol along the outer control surface and the pusher are at different locations along the touch panel.

In some embodiments, the light source is located along an end of the pusher facing the touch panel.

In some embodiments, the first contour is smooth and continuous and the second contour includes a portion that is the same as the first contour and a debossed portion that is spaced away from the first contour.

In some embodiments, the vehicle interior panel is configured to change the touch panel between the first and second shapes in response to a user touching the control surface at a control area of the panel.

In some embodiments, the pusher is one of a plurality of pushers located at a plurality of different locations along the touch panel and substrate. Each pusher is changeable between a retracted condition and an extended condition.

In some embodiments, each pusher is independently controllable such that the touch panel has three or more different shapes in which the outer control surface has corresponding different contours.

In some embodiments, the touch panel includes an elastomeric layer between the outer control surface and the conductive layer.

In some embodiments, the elastomeric layer is a partially transparent and pigmented layer.

In some embodiments, the conductive layer is transparent and sandwiched between first and second elastomeric layers that are at least partially transparent.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel capable of changing the contour of its outer surface, such as from a flat or otherwise smooth appearance to one with noticeably raised areas. In addition to providing a tactile aid for vehicle occupants to identify the control area of the panel with which they are interfacing, the morphing surface provides a modern or futuristic aesthetic effect while also maintaining its utility as a capacitive touch panel.

Figure 1:
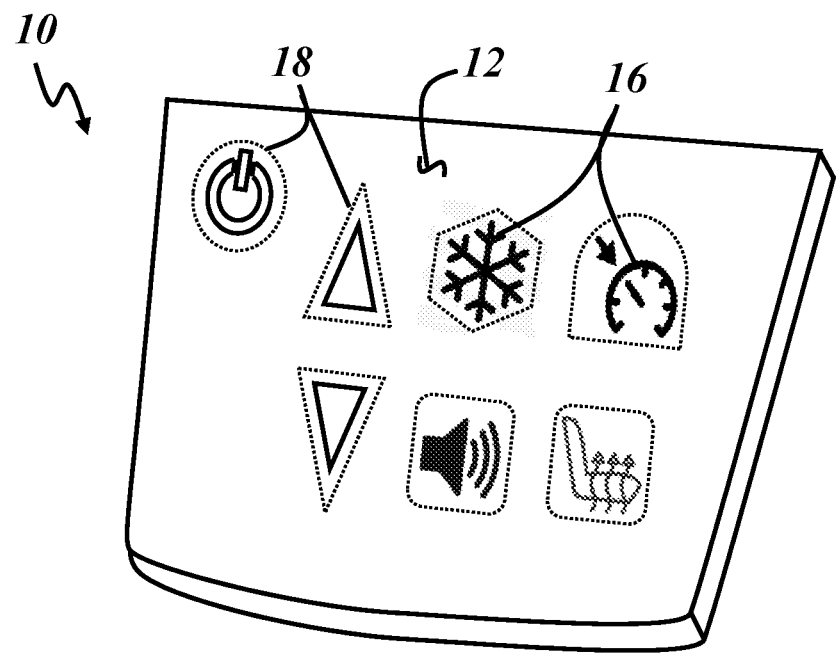
FIG. 1 is a perspective view of a vehicle interior panel having a shape-changing control surface.
Figure 2:
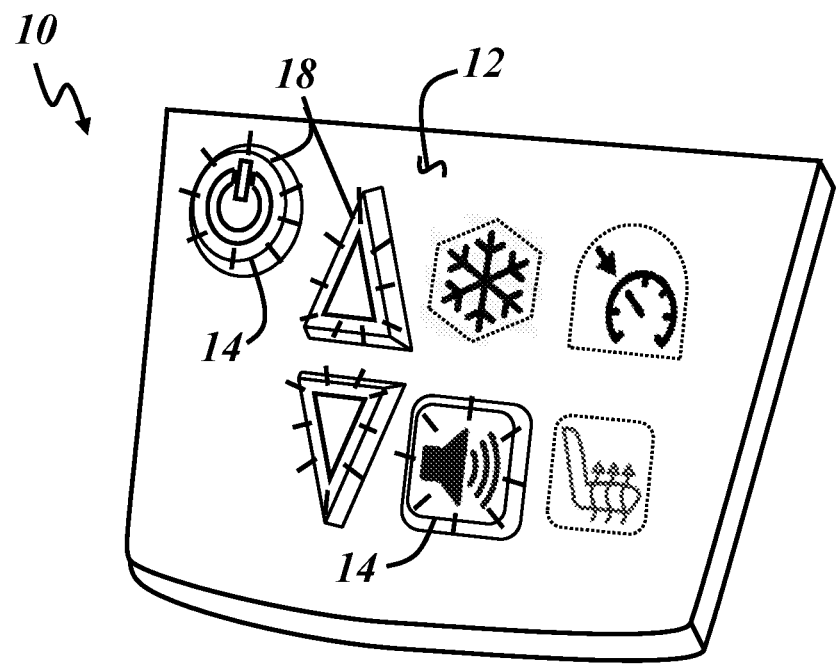
FIG. 2 is a perspective view of the vehicle interior panel of FIG. 1 with a contour of the control surface different from that of FIG. 1.

FIG. 1 is a perspective view of an embodiment of a vehicle interior panel 10 with an outer control surface 12 having a first contour, and FIG. 2 illustrates the same vehicle interior panel 10 with the outer control surface 12 changed to a second and different contour. The first contour is substantially flat or otherwise smooth and continuous with a very large radius of curvature and/or small gradual changes in slope along the surface 12. The second contour includes one or more localized debossed portions 14 protruding from surrounding portions of the surface 12. Stated differently, a portion of the second contour of FIG. 2 is the same as the first contour of FIG. 1, while the debossed portions 14 space part of the surface 12 away from the first contour.

The panel 10 is a control panel configured as a human machine interface (HMI), allowing a user to interact with the panel to operate or control one or more systems of the vehicle in which it is installed. The particularly illustrated panel 10 presents several commonly recognized symbols 16 to the interior of the vehicle to indicate which vehicle system or component is associated with respective control areas 18 of the panel 10. The exemplary control areas 18 are identified by dotted lines in FIG. 1, the boundaries of which may be non-visible to the user, corresponding only to areas of the control surface 12 that are recognized by a system controller when touched. The symbols 16 may be non-visible, always visible, or sometimes visible to the user (e.g., when illuminated), depending on the particular configuration of the panel 10. The illustrated panel 10 may be installed as part of a vehicle instrument panel assembly, but the teachings below are applicable to any panel with an outer control surface facing the interior of a vehicle passenger cabin.

In this example, each debossed portion 14 is co-located with an individual control area 18, and each of the symbols 16 is co-located with a corresponding control area 18. The second contour of FIG. 2 includes four debossed portions 14 at four control areas 18, including a system power control area, an up-arrow control area, a down-arrow control area, and an audio control area. The debossed control areas 18 are also illuminated. Control areas 18 corresponding to climate control, cruise control, and heated seat control remain uni-illuminated in FIG. 2, and the contour of the control surface 12 matches the first contour at those areas. FIG. 1 may represent a power-off condition for the panel 10, with none of the control areas 18 protruding from surrounding portions of the surface 12 or illuminated. FIG. 2 may represent a power-on condition for the panel 10, as indicated by the illuminated power symbol at a debossed portion 14. FIG. 2 may also represent an audio control mode for the panel 10, as indicated by the illuminated audio symbol and associated debossed portion 14. In this and other modes, the up-arrow and down arrow symbols 16 are also illuminated at respective debossed portions 14.

The illustrated embodiment is merely exemplary. There are innumerable possible combinations of debossed portions 14, symbols 16, control areas 18, illumination conditions, etc., and these individual features can be used anywhere along the panel 10 either individually or combined with one or more of the other features. Further, the presence of a debossed portion 14 or illumination along the panel 10 can indicate different states of a vehicle system or component or different manners of controlling such systems or components, and the same control area 18 can be assigned to a different system or function depending on the mode in which the panel is operating. The panel 10 may be configured to operate with one or more separate or integrated electronic controllers configured and/or programmed to control the various possible combinations of debossed portions 14, illuminations, and control area functions. Indeed, vehicle interior designers may find uses for a morphing control surface without symbols or illuminated areas.

Figure 3:
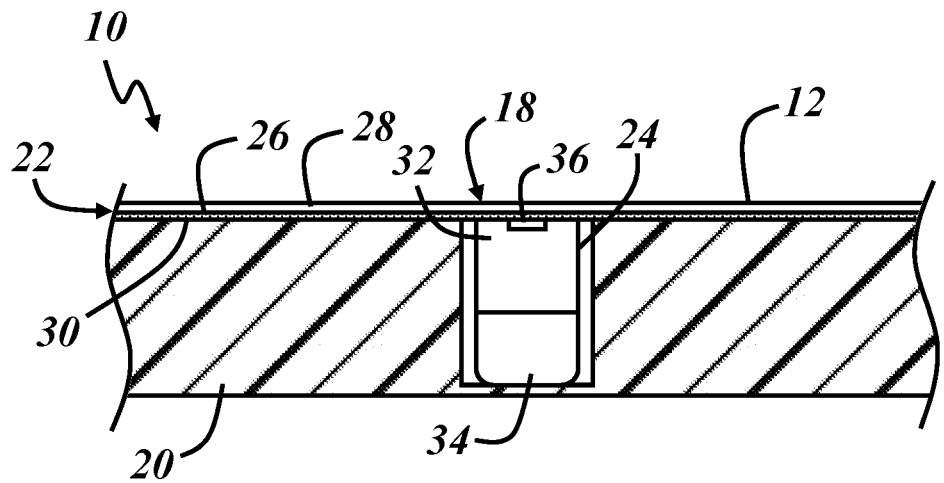
FIG. 3 is a cross-sectional view taken through a control area of the panel of FIG. 1.
Figure 4:
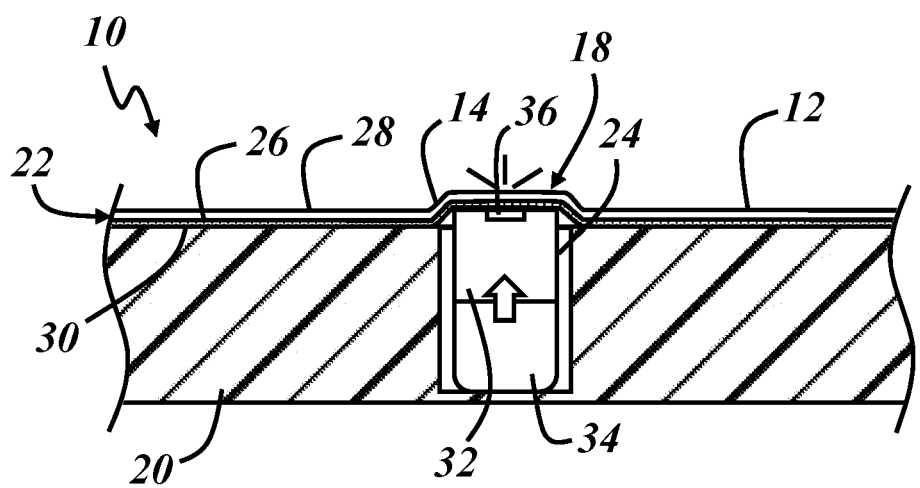
FIG. 4 is a cross-sectional view taken through the same control area as in FIG. 3 with the contour of the control surface different from that of FIG. 3.

FIG. 3 is a cross-sectional view of a portion of the vehicle interior panel 10 taken through one of the control areas 18 with the control surface 12 shaped with the first contour of FIG. 1. The interior panel 10 includes a substrate 20, a capacitive touch panel 22 supported over the substrate, and a pusher 24 extending between the substrate and the touch panel. The substrate 20 may be formed from an injected molded plastic or other suitably rigid material. The capacitive touch panel 22 includes the outer control surface 12 facing away from the substrate 20 and an electrically conductive layer 26 between the outer control surface and the substrate. The pusher 24 is configured to change between a retracted condition, as shown in FIG. 3, and an extended condition, as shown in FIG. 4. The capacitive touch panel 22 is constructed with materials that are sufficiently flexible to elastically change between a first shape (FIG. 3), in which the outer control surface 12 has the first contour, and a second shape (FIG. 4), in which the outer control surface has the different second contour. By virtue of the elastic deformability of all of the layers of the touch panel 22, the touch panel assumes the first shape when the pusher 24 is in the retracted condition and reversibly assumes the second shape when the pusher is in the extended condition. The touch panel 22 may be adhered to or otherwise affixed to the substrate 20 or an intervening layer such that portions of the surface 12 surrounding each control area 18 or intended location of each debossed portion 14 do not move when the pushers 24 move from the retracted to the extended conditions.

Importantly, the conductive layer 26 maintains electrical continuity when the touch panel 22 locally stretches to form the debossed portions 14. One long-felt but unsolved need in the art of capacitive touch panels is an electrically conductive layer that can elastically deform and/or endure localized strain while maintaining electrical continuity. These properties are particularly desirable, and rare, when combined with optical transparency. State-of-the-art capacitive touch panels typically use a thin layer of indium tin oxide (ITO) beneath a layer of glass. Neither transparent metal oxides nor glass is particularly useful in bending or stretching. Even when applied to a more flexible outer layer, such as a transparent polymer film, ITO cracks at very low mechanical strain levels, which defeats its main purpose as an electrical conductor.

In the shape-changing control panel described herein, the conductive layer 26 is configured to endure bending and stretching in a manner superior to conventional transparent metal oxides such as ITO. The conductive layer 26 may include fullerenes, which are allotropes of carbon synthesized in various hollow geometric shapes. Examples of fullerenes include carbon nanotubes (CNTs) and spheroidal fullerenes, which are commonly known as buckyballs. $C_{60}$ is the most well-known spheroidal fullerene, but other ellipsoidal fullerenes (of which spheroidal fullerenes are a subset) may be suitable. Certain combinations of fullerenes have been found to provide sufficient electrical conductivity in the conductive layer 26 while providing optical transparency and enabling sufficient stretching and bending of the touch panel 22 without loss of electrical continuity.

One particular example of a suitable fullerene is a carbon nanobud, which includes a spheroidal fullerene covalently bonded with a CNT. In one example of a nanobud, six covalent carbon-carbon bonds are formed between the spheroidal fullerene and the CNT. The CNT may extend orders of magnitude more than its nanoscale diameter in its lengthwise direction, and each CNT may include more than one spheroidal fullerene—i.e., multiple "buds" along the outer wall of the CNT. Each spheroidal fullerene may be bonded with only one CNT in the conductive layer 26. A greater or lesser amount of covalent bonds between each nanospheroid and nanotube is possible. The spheroidal fullerene of each nanobud may alternatively be covalently bonded with the CNT via intermediary linkages, such as an ester linkage, or there may be intervening carbon-carbon bonds between the spheroid and the CNT.

The spheroidal or ellipsoidal fullerene is believed to offer certain benefits in the conductive layer 26, particularly when paired with conductive nanostructures such as CNTs. For example, when a layer of CNTs is stretched or bent, the individual CNTs can slide past one another and thereby maintain electrical continuity. This alone is better than metal oxides like ITO. The presence of the spheroidal fullerenes is believed to allow even greater elongation and localized strain as the CNTs slide past one another due to the spheroids hooking onto or otherwise interacting with a passing nanotube to cause it to straighten during elongation and thereby maintain electrical continuity among the layer of CNTs. In other words, the spheroidal "buds" may help the CNTs to remain entangled as they are straightened out during elongation of the electrode layer. This may work with other non-carbon conductive nanotubes or other conductive nanostructures such as nanofibers or nanowires.

In the illustrated embodiment, the conductive layer 26 is sandwiched between first and second film layers 28, 30. The first film layer 28 provides the outer control surface 12 of the panel 10 and may include and/or be formed from an elastomeric material. The first film layer 28 may be at least partially transparent to allow the touch panel 22 to be selectively illuminated from behind. Also, the first film layer 28 may be made from a material that is at least partially opaque such that visible light transmittance through the layer 28 is less than 90%, less than 70%, less than 50%, or less than 20%. In one particular example, the film layer 28 is formed from an elastomeric material that is at least partially transparent in its natural state, such as translucent silicone, and tinted black or another relatively dark color such that only relatively intense light is perceived as being transmitted through the material. In this manner, the panel 10 can have a clean and sleek appearance, for example in the power-off condition of FIG. 1, and localized backlight illumination can be selectively provided behind the symbols 16.

This is unconventional in the art of capacitive touch panels. One of the well-known and widely touted advantages of capacitive touch panels over resistive touch panels is the crystal clarity available with the combination of glass and ITO—i.e., resistive touch interfaces require the outer layer to be flexible (i.e., polymeric), which cannot offer the clarity of glass. The capacitive touch panel 22 described here unexpectedly capitalizes on one of the perceived disadvantages of resistive touch panels (lack of optical clarity of polymeric films) by incorporating it into a capacitive touch panel and even further reducing the optical clarity to arrive at a construction with advantages in the particular environment of a vehicle interior.

The second film layer 30 is optional and depicted only as a line in FIGS. 3 and 4. When employed, its primary function is to protect the conductive layer 26 from abrasion due to contact with the pusher 24. The second film layer 30 may also include and/or be formed from an elastomeric material that is at least partially transparent and/or at least partially opaque.

The above-described conductive layer 26 can be suitably conductive at optically transparent layer thicknesses, such as less than 0.4 μm, and can be formed directly on the outer film layer 28 by suitable deposition methods known to nanostructure manufacturers. The optional second film layer 30 can then be subsequently laminated with the first film layer 28 over the conductive layer 26. The illustrated capacitive touch panel 22 is of the surface capacitive variety, having only a single conductive layer. In other embodiments, the touch panel 22 is of the projected capacitive variety and may include an additional conductive layer or a grid of conductive elements beneath the illustrated conductive layer 26 to provide multi-touch and/or more precise touch functionality.

The pusher 24 has a first portion 32 that is fixed in location with respect to the substrate 20 and a second portion 34 that is selectively moveable with respect to the first portion. In this example, the first portion 32 of the pusher is located within a recess and affixed to the substrate therein, while the second portion 34 is configured to move back and forth in directions toward and away from the touch panel 22. Movement of the second portion 34 can be actuated in any of a variety of ways, such as pneumatically, electromagnetically (e.g., a solenoid), piezoelectrically, via a rotating threaded rod, or via a stepper motor, to name a few examples. In this case, the pusher 24 is located between the substrate 20 and the touch panel 22. In other examples, at least a portion of the pusher may extend through and/or be located along the back side of the substrate 20, which faces away from the capacitive touch panel 22.

Actuation may be triggered by human or other conductive touch along the control surface, such as at one of the control areas 18 or anywhere else along the surface 12. For example, the panel 10 may be initially activated from a power-off condition to a power-on condition by touching the panel on or around any of a plurality of control areas 18, thereby causing the pusher 24 associated with the system power control area to change from the retracted condition to the extended condition to cause a debossed portion 14 to be formed and the system power symbol 16 to be illuminated at the corresponding control area. One or more of the other control areas 18 may also be illuminated at this time without a debossed portion being formed until a user touches one of the other control areas to indicate a desire to control the associated vehicle system or component.

In this example, the illumination is provided by a light source 36, such as an LED, located along the second, moving portion 34 of the pusher. In some embodiments, the light source 36 is located elsewhere between the substrate 20 and touch panel 22. In other embodiments, the conductive layer 26 acts as one electrode of an LED light source 36 with the other electrode provided on the pusher 24. Where panel backlighting is provided, at least a portion of the touch panel 22 is at least partly transparent or translucent to permit light from the light source 36 to be emitted from the interior panel 10 through the touch panel 22. Fiber optic light sources or an edge-lit layer of the panel 10 are other possible variations.

In one embodiment, substantially the entire first layer 28 is formed as a tinted translucent layer. In this case, symbols 16 (FIGS. 1 and 2) may be printed in an opaque material along the surface 12 at the appropriate locations such that, when illuminated from behind, each symbol is visible as a dark shape within an illuminated control area 18. In other cases, each symbol may be formed by a mask over the associated light source 36 so that each symbol appears as a lighted shape surrounded by dark portions. Or each symbol may be formed as a plurality of pixels or LEDs laid out in a pattern along the end of the pusher 24 facing the touch panel 22. In another example, the first layer 28 is a translucent or transparent layer with an opaque mask layer along the outer surface 12 with the symbols being formed at portions of the mask layer where the opaque material is missing. In still other embodiments, the light source 36 may illuminate portions of the panel 10 outside any particular control area 18 and/or away from any symbol 16 or debossed portion 14. Or one or more symbols 16 may be located along the surface 12 away from any control area 18 and may or may not be backlit by the light source 36.

In embodiments of the panel 10 capable of forming multiple debossed areas 14, such as in FIG. 2, the pusher 24 is one of a plurality of pushers located at a plurality of different locations along the touch panel 22 and substrate 20. Each pusher 24 may be changeable between retracted and extended conditions and may also be capable of assuming an intermediate or partially extended condition. In some embodiments, each pusher 24 is independently controllable such that the touch panel 22 has three or more different shapes in which the outer control surface 12 has a corresponding number of different contours. For example, a panel 10 made with a number, n, of independently controllable pushers 24 that can each be changed between respective retracted and extended conditions can provide the touch panel 22 with $2^n$ different shapes in which the outer control surface 12 can assume the same number of different contours.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel, comprising:
   a substrate;
   a capacitive touch panel supported over the substrate, the capacitive touch panel comprising an outer control surface facing away from the substrate and an electrically conductive layer between the outer control surface and the substrate; and
   a pusher extending between the substrate and the touch panel, the pusher being changeable between a retracted condition and an extended condition,
   wherein the capacitive touch panel is sufficiently flexible to elastically change between a first shape, in which the outer control surface has a first contour, and a second shape, in which the outer control surface has a second contour different from the first contour,
   wherein the touch panel is configured to assume the first shape when the pusher is in the retracted condition and to assume the second shape when the pusher is in the extended condition,
   wherein the conductive layer is located between the pusher and the outer control surface, and
   wherein the conductive layer elastically deforms together with the outer control surface and maintains electrical continuity when the touch panel changes between the first and second shapes, thereby maintaining capacitive touch functionality of the capacitive touch panel while in the first shape and while in the second shape.

2. The vehicle interior panel of claim 1, wherein the conductive layer comprises carbon nanobuds.

3. The vehicle interior panel of claim 1, further comprising a light source between the substrate and the touch panel, wherein at least a portion of the touch panel is at least partly transparent and permits light from the light source to be emitted from the interior panel through the touch panel.

4. The vehicle interior panel of claim 3, wherein the light source illuminates a symbol along the outer control surface.

5. The vehicle interior panel of claim 4, wherein the symbol is located over the pusher.

6. The vehicle interior panel of claim 4, wherein the symbol and the pusher are at different locations along the touch panel.

7. The vehicle interior panel of claim 3, wherein the light source is located along an end of the pusher facing the touch panel.

8. The vehicle interior panel of claim 1, wherein the first contour is smooth and continuous and the second contour includes a portion that is the same as the first contour and a debossed portion that is spaced away from the first contour.

9. The vehicle interior panel of claim 1, wherein the vehicle interior panel is configured to change the touch panel between the first and second shapes in response to a user touching the control surface at a control area of the panel.

10. The vehicle interior panel of claim 1, wherein the pusher is one of a plurality of pushers located at a plurality of different locations along the touch panel and substrate, each pusher being changeable between a retracted condition and an extended condition.

11. The vehicle interior panel of claim 10, wherein each pusher is independently controllable such that the touch panel has three or more different shapes in which the outer control surface has corresponding different contours.

12. The vehicle interior panel of claim 1, wherein the touch panel includes an elastomeric layer between the outer control surface and the conductive layer.

13. The vehicle interior panel of claim 12, wherein the elastomeric layer is a partially transparent and pigmented layer.

14. The vehicle interior panel of claim 1, wherein the conductive layer is transparent and sandwiched between first and second elastomeric layers that are at least partially transparent.

15. The vehicle interior panel of claim 8, wherein the conductive layer is a continuous layer that extends from a location outside of the debossed portion, across the debossed portion, to another location outside of the debossed portion and on an opposite side of the debossed portion.

16. A vehicle interior panel, comprising:
- a substrate;
- a capacitive touch panel supported over the substrate, the capacitive touch panel comprising an outer control surface facing away from the substrate, a transparent and electrically conductive layer between the outer control surface and the substrate, and a partially transparent and pigmented elastomeric layer between the outer control surface and the electrically conductive layer;
- a pusher extending between the substrate and the touch panel, the pusher being changeable between a retracted condition and an extended condition; and
- a light source located along an end of the pusher facing the touch panel and configured to emit light through the electrically conductive layer and through the elastomeric layer to illuminate the outer control surface,
- wherein the capacitive touch panel is sufficiently flexible to elastically change between a first shape, in which the outer control surface has a first contour, and a second shape, in which the outer control surface has a second contour different from the first contour,
- wherein the touch panel is configured to assume the first shape when the pusher is in the retracted condition and to assume the second shape when the pusher is in the extended condition, and
- wherein the conductive layer maintains electrical continuity when the touch panel changes between the first and second shapes.

17. The vehicle interior panel of claim 16, wherein the conductive layer is a continuous layer sandwiched between the partially transparent and pigmented elastomeric layer and a second elastomeric layer that is at least partially transparent.

* * * * *